United States Patent

Lehovec

[15] 3,704,377

[45] Nov. 28, 1972

[54] LASER COMPRISING FRESNEL OPTICS

[72] Inventor: Kurt Lehovec, Williamstown, Mass.

[73] Assignee: Inventors and Investors, Inc., Williamstown, Mass.

[22] Filed: July 10, 1970

[21] Appl. No.: 61,022

Related U.S. Application Data

[62] Division of Ser. No. 653,245, July 13, 1967, Pat. No. 3,569,997.

[52] U.S. Cl.......331/94.5 D, 250/217 SS, 331/94.5 H

[51] Int. Cl. ...........G02f 1/28, H01j 1/62, H01s 3/00

[58] Field of Search....................331/94.5 D, 94.5 H; 350/162 ZP; 313/108 D; 250/216, 217 SS

[56] References Cited

UNITED STATES PATENTS 2,043,347 6/1936 Clavier et al.........350/162 ZP

*Primary Examiner*—Archie R. Borchelt
*Assistant Examiner*—T. N. Grigsby

[57] ABSTRACT

This invention concerns improved structures for the transformation of radiant energy into electric energy or vice versa. The improvement consists of combining a semiconducting microcircuit element with a Fresnel optical system into a compact integrated structure.

7 Claims, 9 Drawing Figures

LASER COMPRISING FRESNEL OPTICS

This is a division of application Ser. No. 653,245 now U.S. Pat. No. 3,569,977, filed July 13, 1967.

BACKGROUND OF THE INVENTION

Transformation of radiant energy into electric energy and vice versa plays an important role in modern communications, e.g., the television Vidicon camera transforms a light pattern into electrical signals which are transformed back into a visible image in the television receiver set; the sound track on a movie film is used to modulate the energy of a light beam which in turn is transformed into an electrical energy in a photocell and fed into a loud speaker. It is known that radiation can be generated in many electronic semiconductors by recombination of electrons and holes, and conversely, that suitable radiation impinging on such a semiconductor is capable of modulating its electrical properties. Thus transmission of information between two electric sub-systems by means of a light beam is in principle feasible, enabling complete electrical isolation of the sub-systems. [viz. K.Lehovec, Proceedings of the Inst. of Radio Engineers, Nov. 1952, p.1407–1409c].

While great progress has been made in recent years in developing electrical circuits of great versatility and extremely small size, using semiconducting structures with a plurality of p- or n-zones, p-n junctions, metal electrodes, insulating layers on top of a semiconducting wafer with metallized contact regions, etc, which are commonly known as integrated circuits or microcircuits, these structures have not yet been combined into efficient electro-optical systems because of the disparity in size between the microcircuit elements and conventional optical systems, such as lenses or mirrors. Moreover, since the area of microcircuits which may serve as receivers or emitters of radiation are usually minute, of the order of $10^{-4}$ to $10^{-2}$ cm, i.e., of the same magnitude as the elements of a microcircuit in general, great precision is required in combining an optical system and a microcircuit in order to obtain the desired optical alignment.

It is an object of this invention to provide a combination of a microcircuit with an efficient optical system of a compatible size into a single integrated electro-optical structure, this structure having no loose or mobile parts, and achieved by manufacturing processes compatible with those used in the fabrication of semiconducting microcircuits.

It is another object of this invention to provide an integrated electro-optical structure in which a portion or portions of the optical system are also used for performing electric functions, thereby achieving an even higher degree of compactness and integration.

It is another object of this invention to provide integrated electro-optical devices of great simplicity and outstanding electrical and optical properties.

It is another object of this invention to provide an improved signal transfer by means of radiation between two microcircuits which are isolated electrically from each other. This transfer is achieved by integrated electro-optical structures according to this invention.

SUMMARY OF THE INVENTION

Briefly, the invention consists of the combination of a semiconducting microcircuit containing a photo-electric element with so-called Fresnel optics into an integrated structure. Photo-electric element as used in this invention designates any structure enabling the interaction of radiant energy and electric circuit energy. There are four general types of photo-electric elements: (i) the generation of an electric energy by incident radiation, e.g., the photovoltaic or so-called solar cell, (ii) the modulation of an electric signal by incident radiation, e.g., the photoconductor, (iii) the emission of radiant energy from a circuit element under certain electric stimulii, e.g., the p-n junction photoemitters [e.g., K.Lehovec, C.A.Accardo & E.Jamgochian, Phys.Rev. 83, 603–607 (1951)]. (iv) a group of devices which might be called photomodulators, in which the intensity of a beam of radiation passing through the device is modulated by an electric signal applied at the device. Examples of photomodulators include structures previously described by the author of this patent [U.S. Pat. Nos. 2,776,367, 2,929,923, 3,158,746] and devices using the Franz-Keldysh effect.

Each of the four groups of photo-electric elements just mentioned requires an optical system for imaging the radiant energy with respect to the device in order to increase efficiency of the conversion between electric and radiant energy. According to this invention this optical system consists of a Fresnel optical system in an integrated structure with the photo-electric element. In the simplest case such a Fresnel optical system consists of a zone plate, i.e., a sequence of opaque regions on the outer surface of a transparent layer on the photo-electric device. These opaque regions have such lateral dimensions that the optical path-lengths from the openings between said opaque regions to the photo-electric element differ by integer multiples of a wavelength in the case of an incident plan parallel monochromatic light beam to be focused on the photo-electric element. The radiation is then concentrated on the photoelectric element by means of a phenomenon known as interference of light wavelets. Since opaque regions can be produced simply by metallizing, since removal of portions of a metallized layer with small-dimensional tolerance is common practice in microcircuit technology, and since transparent films, e.g., $SiO_2$ or $Si_3N_4$ and low-melting point glass coatings are already widely used in microcircuit technology, the electro-optical system here disclosed is compatible with integrated circuit technology both in size and production technique. Moreover, a portion of the metallized region of a zone plate can be used as an electrode to perform an electric circuit function, e.g., as the gate electrode for a metal-oxide-semiconductor transistor, commonly known as MOST.

Since Fresnel optical systems are designed for a radiation of a well-defined wavelength, the structures of this invention are most useful for monochromatic radiation, as is generated by a laser beam.

DESCRIPTION OF THE PREFERRED EMBODIMENT

Since some plates or more generally Fresnel optics are an integral part of this invention, a few introductory remarks might be in order, although Fresnel optics per se is prior art.

Figure 1:
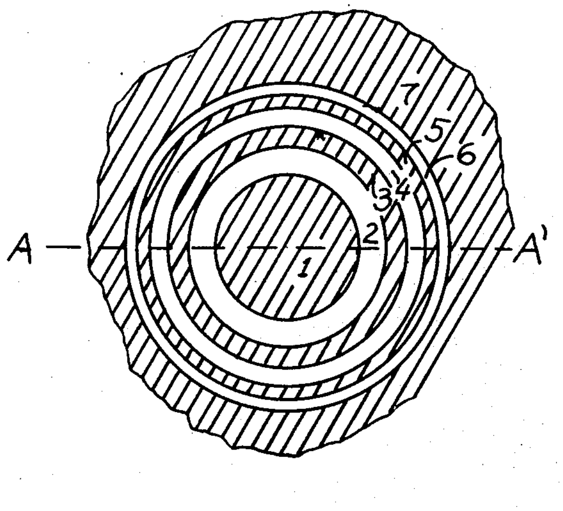
FIG. 1 PRIOR ART
FIG. 1 illustrates a top view of a circular zone plate according to prior art.
Figure 2:
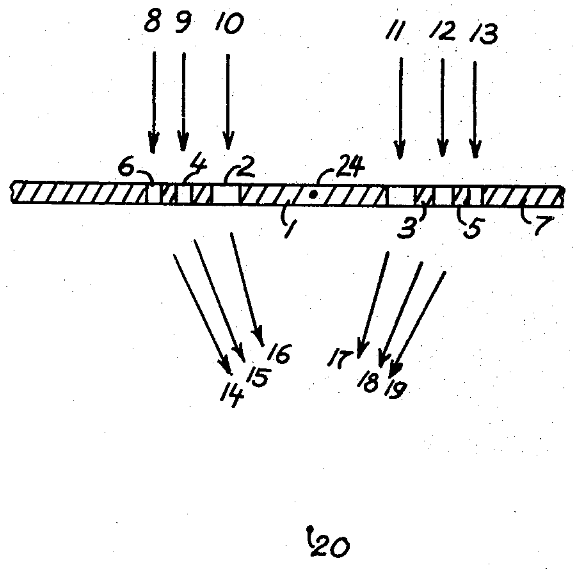
FIG. 2 PRIOR ART
FIG. 2 illustrates a vertical cross-section through this circular zone plate and indicates its well-known property of focusing a parallel light beam into a point.
Figure 3:
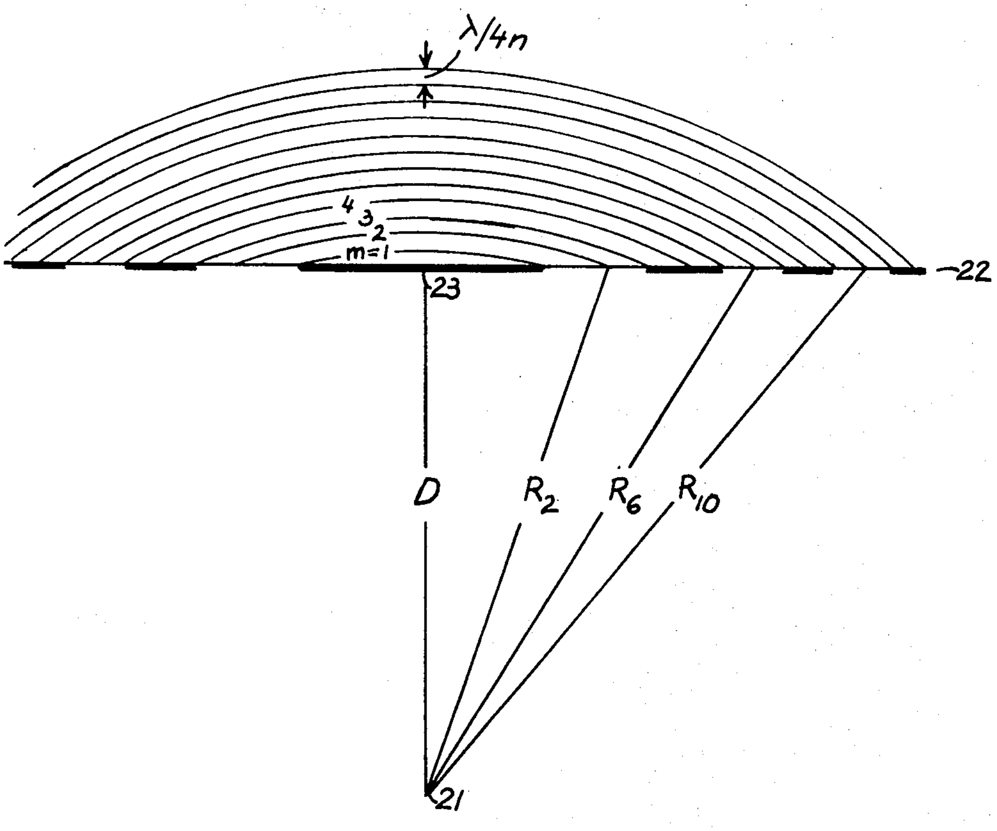
FIG. 3 PRIOR ART
FIG. 3 serves to explain the principle for design of a zone plate.

Fresnel optics utilizes the fact that coherent electromagnetic waves enhance or annihilate each other, depending on their phase relationship. A zone plate is an arrangement of transparent and opaque regions constructed in such a manner that all light wavelets originating from the transparent zones arrive at a given point in phase, or with phase differences of integral multiples of a wavelength. Consider, for instance, the zone plate arrangement whose top view is shown in FIG. 1. This zone plate consists of a planar arrangement of concentric opaque rings 3 and 5, separated by the transparent zones 2, 4, 6. In the case of FIG. 1, the disc-shaped center region is opaque as well as the outer region 7. While FIG. 1 shows only two opaque rings 3 and 5, more than two such rings might be used with corresponding increase in the aperture of the optical system. If the radii of the zones are properly chosen, as will be explained later on hand of FIG. 3, a plane parallel monochromatic light beam directed perpendicular to the plane containing the opaque zones will be focused into a point on the axis of the zone plate. This is illustrated in FIG. 2, which is a vertical cross-section through the zone plate of FIG. 1 along the line A – A'. The arrows 8 – 13 represent rays of an incident parallel light beam. The arrows 14 – 19 are diffracted beams focused into the point 20 on the axis 20 – 24 of the zone plate. In order that this is achieved, the optical path-lengths of the beams 14, 15, 16 must differ by integers of a wavelength $\lambda$ of the incident monochromatic light. This leads to the construction of a zone plate shown in FIG. 3, which is a vertical cross-section similar to FIG. 2. The objective of this zone plate is to focus a parallel light beam incident from above and perpendicular to the zone plate plane 22 into the point 21 at the distance D behind the zone plate. A set of circles with the center at 21 and with radii $R_m = D + m\lambda/4n$ is drawn, where $m$ = 1, 2, 3 etc.; D is the distance between the points 21 and 23; $\lambda$ is the vacuum wavelength of the incident radiation, and n is the index of refraction of the material between the point 21 and the plane 22. The m-values for the four innermost circles are listed in the Figure, as well as the separation $\lambda/4n$ between adjacent circles. The intersects of the circles corresponding to odd values of m with the top plane 22 determine the boundaries between opaque and transparent regions, while the intersects of the circles with $m = 2, 6, 10$, etc. determine the centers of the transparent zones in FIG. 3. Their distances from the image point 21 are designated by $R_2$, $R_6$ and $R_{10}$. The zone plates shown in FIGS. 1 – 3 have an opaque central region. Another set of zone plates is obtained by making the opaque zones in FIGS. 1 – 3 transparent and making the transparent zones in these Figures opaque. Still another set of zone plates of increased intensity is obtained by replacing the opaque regions by regions of a transparent material of such thickness a and refractive index $n'$, that $an' = \lambda/2$.

Figure 4:
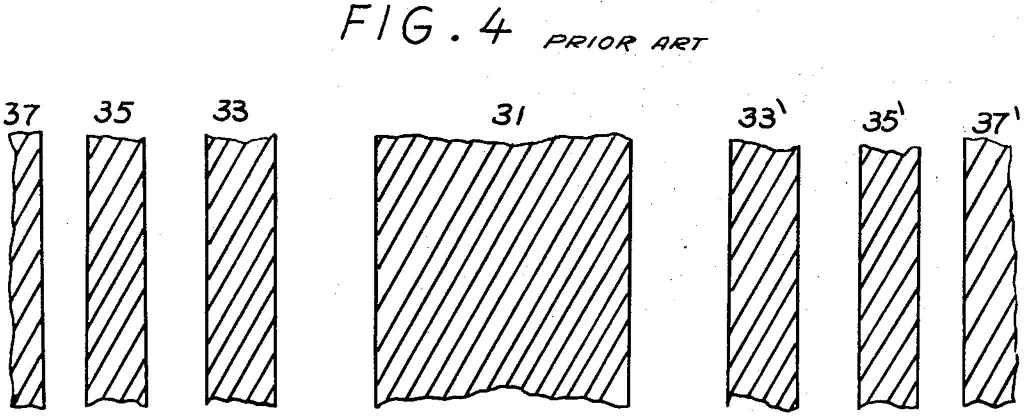
FIG. 4 PRIOR ART
FIG. 4 shows a top view of a linear zone plate.

FIG. 4 is a top view of a linear zone plate structure. The center line 31 corresponds to the center disc 1 of the circular zone plate of FIG. 1, and the line pairs 33, 33', 35, 35' and 37, 37' correspond to the rings 3, 5 and to the outer region 7, respectively. The width of the central line 31 corresponds to the diameter of the disc 1 of FIG. 1, and the distances between the two lines of a pair having equal reference numbers correspond to the diameters of the corresponding opaque rings in FIG. 1. A linear zone plate as shown in FIG. 4 can be used to focus a beam of light having a line-shaped cross-section on a line corresponding to the point 20 in FIG. 2, extended perpendicular to the plane of drawing. This is important, as photo-electric elements in semiconductor devices are frequently line-shaped, e.g. the intersect of a planar p-n junction with the surface of a semiconducting wafer, or else the region between source and drain of a metal-insulator-semiconductor transistor with elongated source and drain regions.

While zone plate optics has been discussed here for focussing a parallel incident beam, the principle of appropriate phase relationship can be applied to construct zone plates for imaging an incident divergent or convergent beam. Obviously, the same optics as used for concentrating an incident beam on a photo-electric element can be used for shaping a light beam emitted from a photo-electric element.

Figure 5:
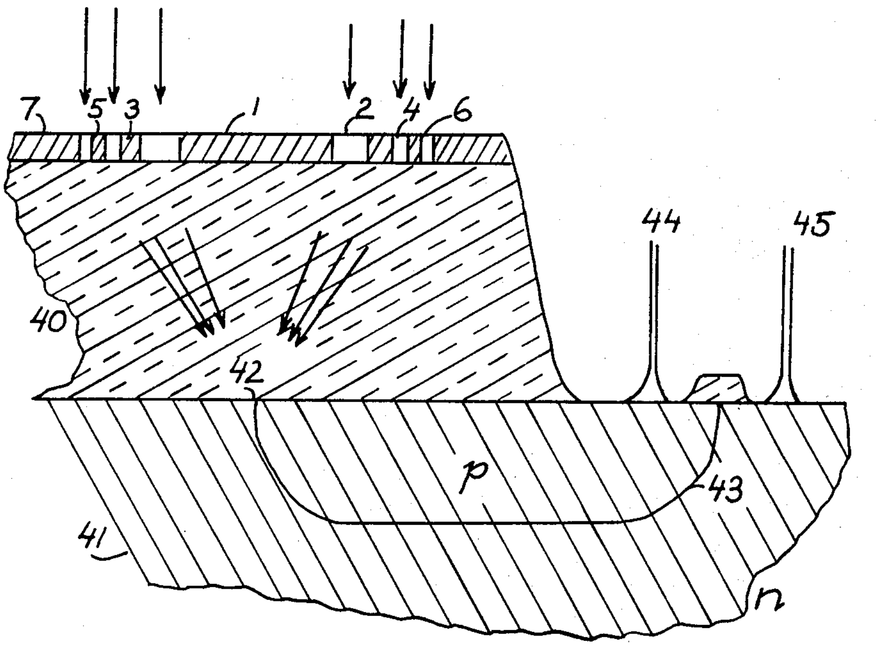
FIG. 5 illustrates a vertical cross-section through an integrated electro-optical structure according to this invention.

We now proceed to examples for the principle of the invention, using the combination of semiconducting microcircuits and zone plate optics into an integrated structure. FIG. 5 is a vertical cross-section through s semiconducting wafer 41, on which a zone plate as shown in the FIGS. 1 and 2 is assembled. The transparent regions are numbered 2, 4, 6, and the opaque regions are designated 1, 3, 5, 7, as in FIG. 1. This zone plate is constructed on top of a transparent insulating solid film 40, which covers the surface of a photo-electric element. The photo-electric element chosen in FIG. 5 is a p-n junction 43 in the semiconducting wafer 41. 44 and 45 are electric contacts to the p- and n-regions: the p-n junction can be used as photovoltaic radiation indicator (so-called solar cell), as photoconductive element, or as radiation-emitting element depending on the bias voltage conditions imposed on 44 and 45. Thus the point 42 can be a light-sensitive, or else a light-emitting element. The zone plate consisting of the transparent layer 40 with the opaque regions 1, 3, 5 and 7 is constructed in such a manner that a parallel light beam incident perpendicular to the surface is focussed into the point 42, located at the intersect of the p-n junction 43 with the wafer surface. The advantage of using the zone plate optics as compared to the same structure without some plate optics lies in the increased intensity of the incident beam at the photoelectric element 42 due to the focussing action of the zone plate.

FIG. 5 merely illustrates the principle of an integrated electro-optical structure, and the particular type of photo-sensitive or radiation-emitting element in the microcircuit is therefore not of primary interest. The efficiency of transformation of electrical and radiant energy can be enhanced in a variety of ways, e.g. (i) the p-region can be made elongated so that the trace of the p-n junction on the wafer surface consists mainly of two parallel lines. In this case one or even two linear zone plates as shown in FIG. 4 can be used to focus the radiation on or from a major portion of the trace of this p-n junction with the wafer surface. (ii) Or else, the trace of the p-n junction 43 on the wafer surface can be made circular and a zone plate system can be constructed which focusses on this circle. This zone plate system can be visualized, in a first approximation, by bending the linear zone plate system of FIG. 4 into a circle of the same diameter as the trace of the p-n junction on the wafer surface, assuming that the distance between the elements 37 and 37′ is small compared to the diameter of said trace of the p-n junction. (iii) The wafer 41 can be made so thin that the p-n junction 43 penetrates through the entire wafer, thus reducing the area of the p-n junction without decreasing the rim of the junction exposed to the radiation. A suitable technique consists, for instance, in using as the semiconducting body 41 silicon grown epitaxially on a sapphire substrate. (iv) By doping one or both of those portions of the p- and n-regions that are adjacent to the transparent insulator 40 more heavily than the bulk of the p- and n-regions, the junction properties at 42 differ from the rest of the junction 43, enhancing the photoelectric p-n junction effects at the surface compared to those of the bulk portions of the p-n junction.

Figure 6:
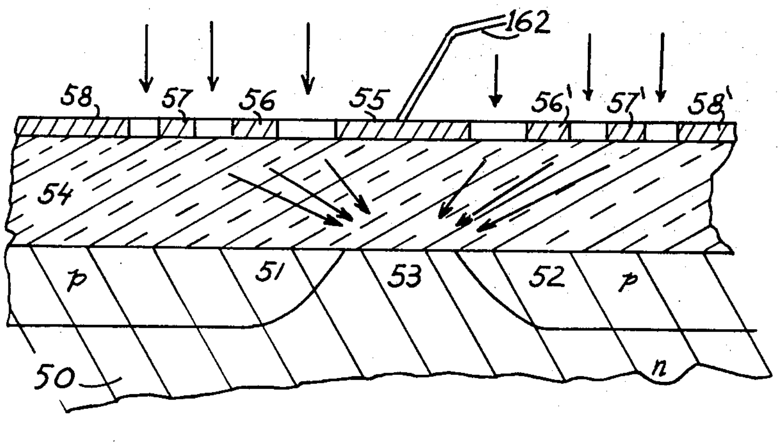
FIG. 6 illustrates a vertical cross-section through another integrated electro-optical structure according to this invention, in which a portion of the zone plate has also an electric circuit function.

FIG. 6 demonstrates the principle of an electro-optical system in which part of the zone plate optics serves also an electric function. The Figure shows a cross-section through an n-type wafer 50, having two p-regions, 51, 52, separated by the narrow portion 53 of the n-type body 50. The regions 51, 52 should be considered elongated, i.e. line-shaped extending perpendicular to the plane of drawing. Contacts (which are not shown in the Figure) are provided to these regions. The semiconducting wafer is covered by a transparent insulating film 54, whose outer surface carries a linear zone plate of the type shown in FIG. 4 with the opaque elements 55, 56, 56′, 57, 57′ and 58, 58′ corresponding to 31, 33, 33′, 35, 35′ and 37, 37′ of FIG. 4. The innermost opaque region 55 consists of a metallized layer to which an electrical contact 162 is attached. The contact 55 and the regions 51 and 52 represent the gate, source and drain, respectively, of a conventional metal-insulator-semiconductor transistor commonly known as MOST. The structure of FIG. 6 differs from a conventional MOST only in having the opaque regions 56, 56′, 57, 57′ and 58, 58′. These regions are arranged in such a manner that incident monochromatic light is focussed on the region 53, as is shown schematically by the arrows in the Figure. The photon energy of this light has to be larger than the forbidden band gap of the semiconducting body; the device shown then becomes an efficient photosensitive MOST, as will be recognized from the following: In the dark, the p-regions 51 and 52 are isolated from each other by the n-layer 53 unless a positive charge, a so-called inversion layer, is induced on the surface of 53 by applying a sufficiently large negative bias to the gate electrode 55. The minimum bias voltage causing an inversion layer to appear is called the turn-on voltage. If the region 53 is illuminated with radiation generating electron-hole pairs, the holes are swept to the surface of 53 by the negative bias applied to 55 and cause a conducting path between 51 and 52 even though the bias to 55 may be less than the turn-on voltage in the dark. Thus, with a suitably chosen bias voltage to 55, the MOST is turned-on in the light but turned-off in the dark. Note that the zone plate optics enables focussing of light to the region 53 even though this region is shielded against direct illumination by the opaque gate electrode 55. The arrangement is superior to an ordinary MOST with transparent gate electrode by the increased efficiency for light conversion by means of the zone plate action which increases the intensity of light at the surface of 53.

The device shown in FIG. 6 can operate also as a light emitter, as will be recognized from the following. With a high negative bias voltage applied to the gate 55 with respect to the bulk of the semiconductor 50, a positive charge, so-called inversion charge, is induced on the surface of 53. When the bias voltage of the gate 55 is switched to a positive value, this inversion charge is repelled from the wafer surface and electrons from the n-type bulk 50 are attracted to the surface of 53. Thus the inversion charge is annihilated by recombination of electrons and holes. Part of the energy released by this recombination is emitted as radiation. The zone plate optics serves to focus this radiation in an efficient manner into a light beam emerging from the device. The amount of radiation emitted can be regulated by several means including the magnitude of the negative bias applied to the gate prior to switching to a positive bias. Thus we have an efficient means for modulating light emission from a point of the surface of a semiconducting wafer by means of an electric signal, and for collecting this radiation into a useful beam.

The inversion charge which exists at the surface of 53 when a negative bias is applied to the gate electrode 55 can be generated in a variety of ways, including (i) lateral injection from the p-regions 51 and 52; (ii) collection of holes thermally generated in the bulk n-layer 50 at the surface of 53; (iii) collection of holes generated by the avalanche effect in a strong field induced in 53 by applying a sufficiently large negative potential to the gate electrode 55; (iv) tunneling of electrons from the valence band into the conduction band in the strong field induced in 53 by applying a sufficiently large negative potential to the gate electrode 55; (v) collection of holes generated in 53 or in the bulk 50 by illumination with light of a suitable wavelength. This illumination can be of a sufficiently shorter wavelength than the radiation emitted from 53, so that optical separation is possible. For instance in the case of silicon, the illumination can be in the ultraviolet while the emitted radiation will be in the red and near infrared portion of the spectrum. By choosing the incident radiation for illumination of such a wavelength, that the wavelength of the emitted radiation is an integer multiple of the wavelength of the incident radiation, the same zone plate which collects the radiation emitted from 53 into a parallel outgoing beam will also focus the normal incident parallel beam radiation onto the region 53; (vi) Collection of holes injected across a p-n junction located in the bulk of the semiconductor 50 adjacent to the portion 53.

Thus there are a variety of ways to charge the inversion layer. Some do not require contacts other than the gate contact 62 and a second contact to the n-type bulk of the wafer 50, i.e. they do not even require the p-regions 51 and 52. While the device of FIG 6 has been described in terms of an n-type body with a positive inversion layer, a similar device can be made from a p-type body by applying positive bias voltages to the gate to cause a negative inversion layer and using n-regions 51 and 52.

It has been mentioned already that Fresnel optics of which zone plates are a special case, is based on the principle of interference of coherent radiation. Since interference conditions cannot be satisfied over a wide range of wavelengths of radiation, Fresnel optics is most suitable for monochromatic light beams. Extremely monochromatic light beams are generated by lasers. Certain types of lasers, so-called p-n junction lasers, utilize semiconductors and are, therefore, compatible with the general technology used in preparation of the examples discussed in the FIGS. 5 and 6. Moreover, the electro-optical structures of my invention are particularly suitable for the construction of novel types of lasers.

Figure 7:
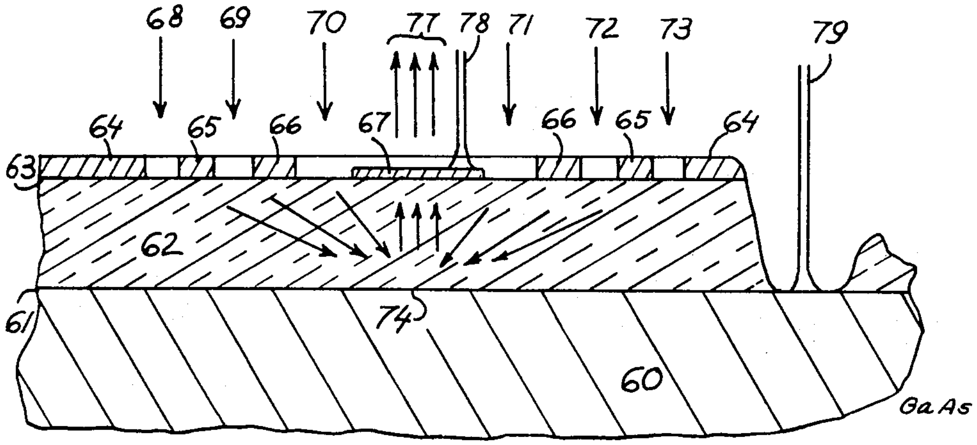
FIG. 7 illustrates a vertical cross-section through an integrated electro-optical surface laser device according to this invention.

In general, a laser requires three elements in suitable combination: (i) a material capable of emitting radiation, e.g. by recombination of electrons and holes in a semiconductor, (ii) certain optical boundary conditions for the emitted radiation leading to a standing wave pattern, and (iii) optical and/or electrical pumping to populate the excited states participating in the electron transition which leads to the emission of radiation. FIG. 7 shows a structure similar to that of FIG. 6 which, in addition, satisfies the optical boundary condition for the emitted radiation and enables optical pumping and electrical triggering of laser action.

FIG. 7 is a schematic cross-section through a semiconducting body 60, having a plane surface 61 which is covered by an insulating transparent layer 62. The outer surface of this insulating layer 63 carries a circular zone plate pattern consisting of the opaque regions 64 – 66 and the semitransparent central region 67. The zone plate pattern is designed to focus the incident optical pump energy indicated schematically by the arrows 68 – 73 onto the point 74 on the wafer surface 61, causing there a high pump intensity. The width of the transparent layer 62 between the point 74 and the semitransparent layer 67 is chosen in such a manner as to provide a standing wave pattern for the laser radiation. The laser beam 77 emerges through the semitransparent coating 67. The laser beam can be triggered electrically using the contact 78 to the transparent coating 67 and the contact 79 to the semiconducting body 60. The triggering consists of switching from a negative potential of 78 versus 79 to a positive potential in the case that the semiconducting body 60 is of the n-type. In the case of a p-type body a positive potential to 78 is switched to a negative value to trigger the laser beam.

Figure 8:
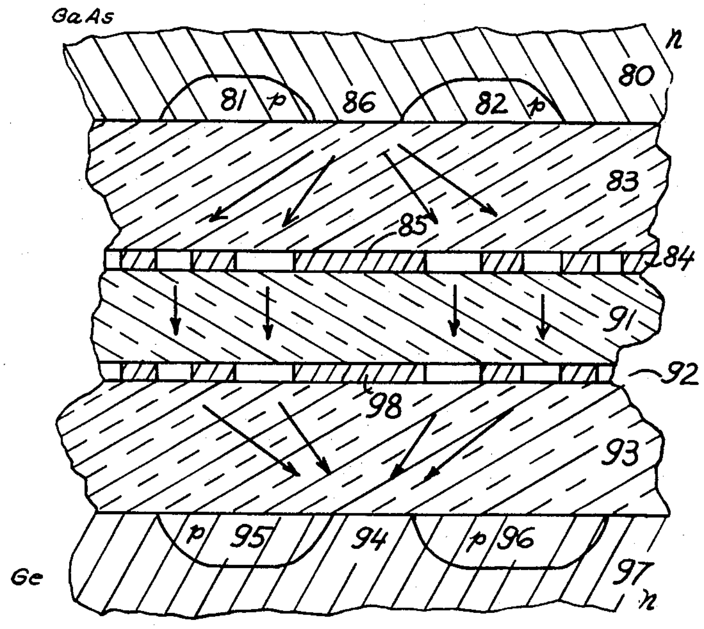
FIG. 8 illustrates a vertical cross-section through two electro-optical sub-systems isolated from each other electrically but in communication with each other by means of radiant energy.

FIG. 8 illustrates the optical coupling of two isolated micro-circuits using two sub-structures as were discussed on hand of FIG. 6. An n-type semiconducting body 80 contains two p-regions 81, 82, which represent source and drain of an MOST. An insulating transparent solid layer 83 carries a zone plate optics 84 on that surface which is not in contact with the body 80. The central part 85 of the zone plate 84 serves as the gate electrode to the MOST. The zone plate is designed to focus light emerging from the region 86 into a parallel beam. Four such beams are indicated by arrows in FIG. 8. The space 91 beyond the zone plate is transparent and connects to another microcircuit carrying a second zone plate system 92 on the surface of a transparent layer 93. In FIG. 8 the second microcircuit system contains a MOST-type radiation receiver with the regions 94, 95 and 96, similar to that shown in FIG. 6. No further details will be given, therefore. It should be noted, however, that the semiconductor 97, carrying the light receiving system, should have a narrower band gap than the semiconductor 80, from which the emitter of light has been made. Suitable choices are GaAs or GaP for the light-emitting semiconductor 80, and Si or Ge for the light-receiving semiconductor 97. The transparent layer 91 can be an optical glue such as Canada balsam. In certain cases where isolation between the gate electrodes 85 and 98 of the two systems is not required, the two zone plates 84 and 92 can be combined into a single one. Moreover, a single zone plate on the top of a transparent layer can be used to image radiation emitted from a light-emitting element on a planar surface of a semiconducting wafer to a light-sensitive element displaced laterally on the same wafer surface. In this case the chemical composition of the wafer must vary laterally to make a portion of the wafer photo-electrically sensitive to the light emitted from another portion, and the zone plate system must be constructed on the surface between the light-emitting and the light-receiving element in such a manner that the optical paths lengths of all light beams emerging from the emitting element and arriving at the receiving element after reaching the zone plate surface differ by integer multiples of a wavelength.

Figure 9:
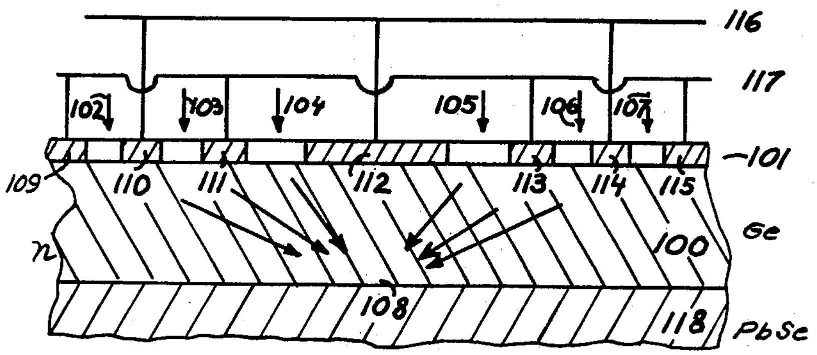
FIG. 9 illustrates a vertical cross-section through an integrated electro-optical structure according to this invention for modulation of radiant energy by an electric signal and for optical imaging of said radiation.

All examples for integrated electro-optical structures described so far utilized an insulating transparent layer between the plane of the zone plate and the body of a semiconductor. However, this invention includes structures without any transparent layer made from an electric insulator. FIG. 9, for example, shows an integrated electro-optical structure according to my invention for the purpose of electrically modulating the intensity of a beam of radiation and at the same time forming an optical image of said radiation. FIG. 9 illustrates in cross-section a semiconducting wafer 100 carrying on one of its surfaces a zone plate optical system 101 which focusses the incident parallel monochromatic light beams 102 – 107 onto the small area 108. The opaque regions of the zone plate 109 – 115 are electrically conducting and form electrically-blocking contacts with the underlying semiconductor substrate 100. The regions 109 – 115 are electrically connected to the contacts 116 and 117 in such a manner that potentials can be applied between adjacent opaque regions, generating high electric fields along the surface of the semiconducting body 100 under the transparent regions of the zone plate. It is known (so-called Franz-Keldysh effect) that such fields enhance the absorption of a beam of radiation of a wavelength at the lattice absorption edge of the semiconductor 100. Thus the zone plate system consisting of the opaque elements 109 – 115 and the semiconducting body 100 serves not only to focus the radiation 102 – 107 on the small area 108, but also to modulate the intensity of this radiation by an electric signal applied between 116 and 117. It should be mentioned in passing that for the light modulation by the Franz-Keldysh effect, the polarities applied to 116 and 117 with respect to the semiconducting body 100 should be such as to maintain a blocking bias between the contacts 109 – 115 and the semiconducting body 100. On the other hand, the absorption of the radiation can be modulated by injection of minority carriers, in which case two adjacent conducting elements of the zone plate act as emitter and collector, respectively, of a lateral transistor, and the emitter is biased in the forward direction versus the semiconducting body, while the collector is biased in the blocking direction.

Adjacent to the semiconducting body 100, another semiconducting body 118 can be arranged, carrying a photo-electric element (not shown) adjacent to the area 108 on which the radiation is focussed. Such an element may serve as radiation receiver, or else it may be an emitter of radiation emerging from the structure in the parallel beams 102 – 107, modulated in intensity by an electric signal applied between the electrodes 116 and 117.

It is obvious that the small size of the structures discussed here and their compatibility with semiconductor microcircuit technology enables the arrangement of many such individual structures into matrices or mosaics, and in combination with so-called ring-counter or clock circuits, the creation of optical display patterns such as television screens, watch dials, etc.

The methods required for preparation of the structures described here are all well-known in semiconductor microcircuit technology. These methods include single crystal growth of a semiconducting body, cutting, lapping and etching operations, protecting parts of the surface by an oxide, nitride or similar, and diffusing impurities through unprotected portions, metallization by vacuum vaporization, and the photo resist technique to optically "machine" microstructures with a resolution of about 1 micron or even less.

Since the invention lies not in the individual preparation steps but in the combination of known sub-structures to achieve a whole new class of novel and useful devices, we shall describe the conventional preparation methods and construction details only briefly.

Examples for the preparation of structures as shown in the FIGS. 5 – 9 are as follows: in structures of the type shown in FIGS. 5 and 6, the semiconducting body may consist of silicon with an incident radiation of about 1 micron wavelength. The p- and n-regions in the silicon can be prepared in the well-known manner, e.g. by doping with boron or arsenic impurities. The semiconducting body 50 in FIG. 6 may consist of 1 ohm-cm As doped silicon being n-type with more heavily-doped p-regions obtained by diffusion of boron through openings in a silicon oxide mask on the wafer surface. The distance between the p-regions 51 and 52 along the wafer surface can be chosen to be 2 microns. The transparent layers 40 in FIG. 5 and 54 in FIG. 6 may consist of $Si_3N_4$ of 4 microns thickness, formed by chemical deposition on the semiconducting body from a gaseous ammonia-$SiH_4$ mixture at 900 °C. It is advisable to coat the silicon with oxide films of a few hundreds Angstrom-units thickness by exposure to dry oxygen at 1000 °C, prior to depositing the nitride. The outer nitride surface is then coated with an evaporized aluminum layer about 0.1 microns thick. Using photo resist technique, portions are etched out from the aluminum to create the zone plate pattern. For illumination with a parallel light beam of 1 micron wavelength, the distances of the centers of the transparent lines from the center of the pattern are chosen as follows: $R_2 = 1.5$ microns, $R_6 = 2.6$ microns, and $R_{10} = 3.4$ microns. These values were obtained by the construction shown in FIG. 3 considering that the index of refraction for $Si_3N_4$ is $n = 2.1$, so that the wavelength of the radiation used in the nitride is about 0.5 microns. Contacts are made in the conventional manner for microcircuits by thermo-compression bonding of Al or Au wires to the p- and n-regions in FIG. 5, and 50, 51, 52 and 55 in FIG. 6. As an alternative to the silicon nitride layer, one may use a layer of a low-melting glass developed for protection of silicon microcircuits, taking into account, of course, the index of refraction of said layer in the design of the zone plate optics.

In FIG. 7 the semiconducting body 60 can be a gallium arsenide crystal and the incident pump radiation 68 – 73 can be the strong green mercury line of a high pressure mercury arc discharge lamp. The transparent layer 62 can be $Si_3N_4$ and the standing wave condition is $m \cdot \lambda_v = Dn'$, where D is the thickness of the layer 62, $n'$ is the index of refraction of this layer, $\lambda_v$ is the vacuum wavelength of the laser radiation, and $m$ is an integer number. The semitransparent coating 67 can be a gold film a few hundreds of Angstrom-units thick.

In FIG. 8 the radiation-emitting semiconductor 80 can be made of gallium arsenide and the radiation-sensitive semiconductor 97 can be made of germanium.

In FIG. 9 the semiconducting body 100 can be made of n-type germanium doped by arsenic to have a resistivity of 10 ohm-cm. The opaque zones 109 – 115 are made by vapor plating the semiconducting wafer surface with an indium-cadmium alloy of the composition 10 percent weight indium and 90 percent wt cadmium, and by removing part of the alloy by photoresist technique and etching. The remaining portions 109 – 115 can be micro-alloyed into the germanium surface to improve adherence and electric junction properties. This procedure is similar to that used in the micro-alloy p-n-p transistors for preparing the collector contact. An electric contact (not shown in FIG. 9) to the n-type bulk 100 can be made by fusing an Au-Sb alloy to a sandblasted region of the wafer. The radiation to be modulated by the Franz-Keldysh effect has a vacuum wave-length of about 1.6 microns and the zone plate optics has to be designed according to the principles of FIG. 3, taking into account that the refractive index of germanium is $n = 4$. The photo-sensitive film 118 can be made from a PbSe film. The structure of FIG. 9 can also be made of a gallium-arsenide body 100 and an epitaxial germanium film 118, with the appropriate changes in the wavelength of radiation and design of the zone plate optics. In this case the hetero-junction between the GaAs-body 100 and the Ge-film 118 can serve as the photosensitive receiver element for the radiation.

Since the concentration of carriers of electricity in most semiconducting materials can be changed reversibly by suitable radiation, it is obvious that any device made from such materials could form a part of the structures considered in my invention. This includes semiconducting resistors, p-n junction devices, surface barrier devices, p-n-p and n-p-n transistors, so-called MOST's, solid state lasers of the p-n junction types, and many others. Of particular usefulness are semiconducting devices located at or close to a plane surface of a wafer as is usually the case in planar technology. Among these devices we like to emphasize particularly the MOST's and the lateral bipolar transistors.

While electrical conduction of the semiconductor type is the most common in the structures of my invention, the scope of my invention covers structures which do not necessarily include semiconducting elements. For instance, at least in principle, the material of the body 60 in FIG. 7 need not be semiconducting but could be a ruby crystal as used for ruby lasers.

As many apparently widely differing embodiments of my invention may be made without departing from the spirit and scope thereof, it is to be understood that my invention is not limited to the specific embodiments hereof, except as defined in the appended claims, in which *photo-electric element* includes any structure or device enabling transformation of electric circuit energy into radiant energy or vice versa, or else enabling modulation of radiant energy by an electric signal; *Fresnel optical system* means any structure for image formation of a beam of coherent radiation by means of interference of wavelets of said radiation, said wavelets originating on said structure, and *intimate inseparable combination* of two parts means their combination in a single solid structure, which does not permit any adjustments of the relative location of said parts with respect to each other after preparation without destroying at least one of said parts.

What is claimed is:

1. A solid state laser structure including optical pumping, said structure comprising a laser material and a diffractive Fresnel optical system in intimate inseparable combination, said Fresnel optical system concentrating pump radiation on said laser material.

2. An integrated electro-optical device comprising a semiconducting body capable of emitting radiation by the transition of excited electrons into lower energy states, a solid layer transparent to said radiation adjacent to the surface of said body, a Fresnel optical system on the outer surface of said transparent layer, said Fresnel optical system focussing incident pump radiation on said surface of the semiconducting body, said pump radiation being of a wavelength capable to generate said excited electrons; said semiconducting body, said transparent solid layer and said Fresnel optical system in intimate inseparable combination.

3. The integrated electro-optical device of claim 2, including a semitransparent conducting film over a small portion of the outer surface of said transparent layer and electrical contacts to said semitransparent film and to said semiconducting body.

4. The device of claim 3 whereby said semitransparent film is part of said Fresnel optical system.

5. The device of claim 3 whereby said transparent layer is dimensioned with respect to the wavelength of said radiation to be part of an optical cavity.

6. A solid state laser including a transparent layer on one of its surfaces, a diffractive Fresnel optical system on said transparent layer to shape the radiation emitted from said laser through said one of its surfaces.

7. A solid state laser comprising transparent layer having two plane parallel surfaces, a diffractive Fresnel optical system comprising spaced zones on one of its surfaces in solid inseparable combination with it, the width of said transparent layer between said plane parallel surfaces chosen in relation to the spacing of the zones of said diffractive Fresnel optical system and to the wavelength of a beam of coherent monochromatic radiation incident under a suitable angle and passing through said diffractive Fresnel optical system and said transparent layer.

* * * * *